J. L. STEWART.
TOOLS FOR SHAPING THE NECKS OF GLASS BOTTLES.

No. 175,777. Patented April 4, 1876.

WITNESSES:

INVENTOR:
Jno. L. Stewart,
BY
ATTORNEYS.

UNITED STATES PATENT OFFICE.

JOHN L. STEWART, OF ELLICOTT CITY, MARYLAND.

IMPROVEMENT IN TOOLS FOR SHAPING THE NECKS OF GLASS BOTTLES.

Specification forming part of Letters Patent No. 175,777, dated April 4, 1876; application filed March 22, 1876.

*To all whom it may concern:*

Be it known that I, JOHN L. STEWART, of Ellicott City, in the county of Howard and State of Maryland, have invented a new and Improved Tool for Shaping the inside of the Neck of Glass Bottles; and I do hereby declare that the following is a full, clear, and exact description of the same, reference being had to the accompanying drawing, forming part of this specification, in which—

Figure 1:
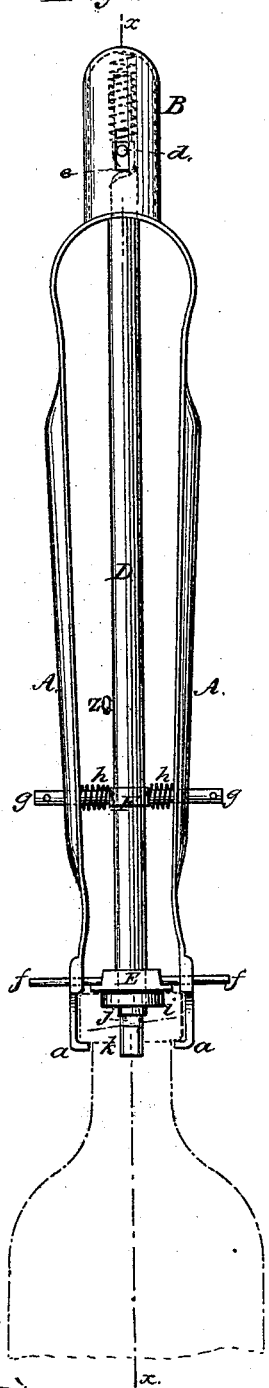
Figure 2:
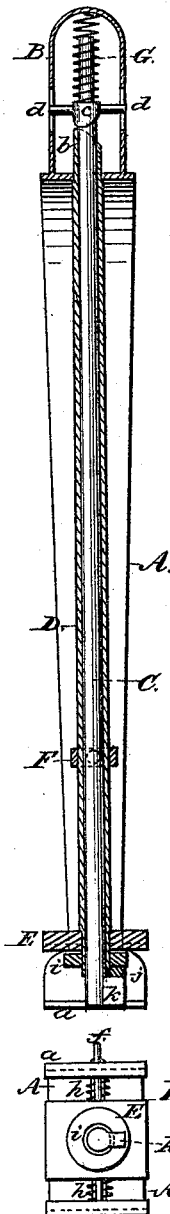
Figure 3:
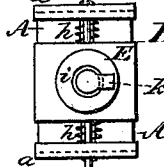

Figure 1 is a side view of the former, showing its application to a bottle, which latter is shown in dotted lines; Fig. 2, a longitudinal section through line *x x* of Fig. 1. Fig. 3 is an end view.

My invention relates to a novel construction of tool or former for shaping the inside of the neck of glass bottles, so as to adapt them to receive a stopper of peculiar form.

My invention is more particularly applicable to forming that class of bottles which are used for aerated liquids, and which, with my device hereinafter described, are so shaped as to be adapted to be closed by a stopper having a bit upon the lower end, which, when turned, binds against a cam-ledge; which form of bottle and stopper, being also original, I propose to make the subject-matter of a separate application.

The present invention consists mainly of a pair of jaws carrying a centrally located rod surrounded by a loose tubular sleeve. The rod and sleeve each carry a key-shaped bit, and as the jaws clamp the neck of the bottle and are turned, or the bottle rolled, the bit of the sleeve, being imbedded in the plastic glass, holds the sleeve fixedly to the bottle, which imparts, through a cam, a longitudinal movement to the rod held in the jaws, which causes the bit of the rod to form a rising and falling cam in the plastic glass, with a key-hole shaped orifice for the bottle.

In the drawing, A represents the two jaws, made of thin springing metal, and attached at one end to a socket, B. These jaws are made with hooked or inwardly-flanged ends *a*, to catch beneath the rim of the bottle-neck and hold the same while the tool is being turned, or the bottle rolled. These flanged ends and the adjoining portion of the jaws may be made straight, as shown, or if it be found more desirable they may be curved to correspond to the circular form of the bottle-neck. C is the central rod, and D the loose tubular sleeve surrounding the same. The said sleeve is journaled so as to revolve in a plate, E, a collar, F, and the socket B, and the rod C is arranged inside of the sleeve so as to slide longitudinally, from the action of a cam, *b*, upon the sleeve, upon a cam, *c*, upon the rod arranged inside of the socket B, the said rod being guided in its said movement by studs, *d*, projecting through guide-slots, *e*, in the socket. The plate E and collar F are provided with arms *f*. and *g* respectively, that project through perforations in the jaws. These arms serve to guide the said jaws in their movement to clasp the bottle neck, and also hold the said collar and plate stationary with respect to the jaws, so as to form bearings for the sleeve D. The arms *g* are provided with spiral springs, *h*, which serve to hold the jaws apart ready to receive the neck of the bottle. These springs, however, may in some cases be dispensed with, as the jaws may be made of metal possessed of sufficient elasticity to serve the same purpose. The sleeve D carries upon its lower end a disk, *i*, and a bit or lug, *j*, while the rod C carries a bit or lug, *k*, of the same transverse dimensions as *j*, and is pressed downwardly by a spring, G, in the socket.

The operation of the tool as thus constructed is as follows: The neck of the bottle being in a plastic and heated state, with a small aperture communicating with the interior, the rim on the neck is grasped upon the outside by the jaws, while the bits *j* and *k*, and the disk *i*, enter the neck of the bottle. The disk *i* forms a central recess or depression in the top of the neck, (to receive a portion of the stopper,) while the bits, which are arranged in an alignment, form a key-hole shaped opening communicating with the interior of the bottle. Now, upon turning the tool or rolling the bottle, the bit *j*, being embedded in the glass, holds the loose sleeve fast to the rolling bottle, while the rod, with bit *k*, forms the cam. As the sleeve thus moves upon the rod, the cams *b* and *c* allow the spring G to force the rod longitudinally downward, and upon completing the revolution, again lift the rod to its former position. This longitudinal movement of bit $k$, together with the rotary movement of the bottle, causes it to form, with its upper edge, in the plastic glass a rising and falling cam. After the bit $k$ has completed its revolution and is again in alignment with bit $j$, the jaws are released and the devices withdrawn, leaving a key-hole orifice through the neck, with a circular depression upon the top, and a cam-ledge below upon the inside.

To enable the operator to know when the two bits are in alignment so as to be withdrawn without breaking the cam-ledge, I have arranged upon the sleeve a small knob $z$, which indicates the position of the bits upon the sleeve and rod.

The former, as hereinbefore described, has been constructed with special reference to the construction of the cam upon the inside of the necks of bottles; but I do not propose to confine myself to the application of the device alone, but shall construct the devices with double cams operating upon the same principle, but with a modified construction, and thus adapt it to the forming of the cams upon fruit and other glass jars.

Having thus described my invention, what I claim as new is—

1. The combination, with a pair of clamping-jaws, A, of a central rod, C, carrying upon its lower end a bit, $k$, for the purpose of forming a key-hole orifice, as described.

2. The combination, with a pair of clamping-jaws, A, of a central rod, C, having a bit, $k$, and operating with an automatic longitudinal movement, for the purpose described.

3. The combination of springing jaws A, loose sleeve D, having bit $j$ and cam $b$, rod C, having bit $k$ and cam $c$, the spring G, and the collar F, having arms $g$, as and for the purpose described.

4. The jaws A, rod C, and sleeve D, in combination with the socket B, for the purpose described.

5. The loose sleeve D, carrying disk $i$ and bit $j$, in combination with the longitudinally-moving rod C, carrying bit $k$, for the purpose described.

JOHN L. STEWART.

Witnesses:
 CHAS. A. PETTIT,
 SOLON C. KEMON.